Jan. 17, 1961     D. B. AVERY, SR     2,968,375
MACHINE RAIL STEEL PLUG
Filed July 23, 1958
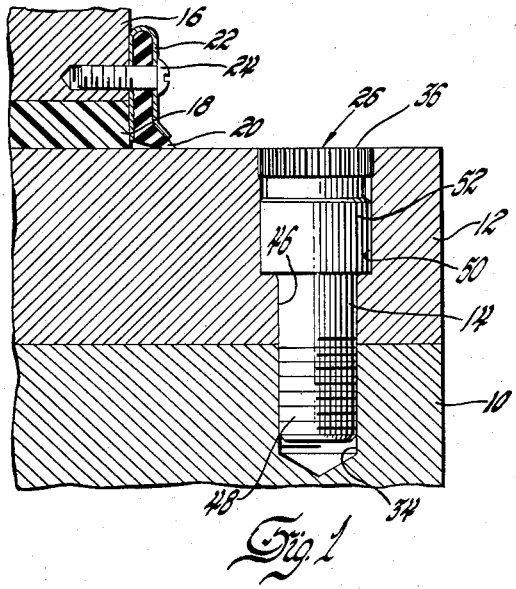
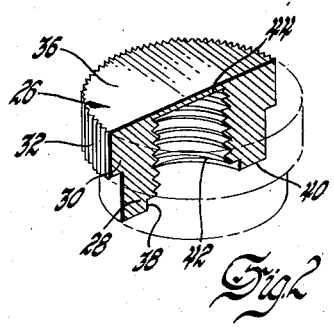
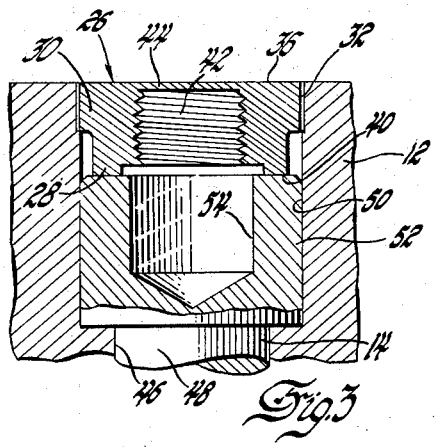
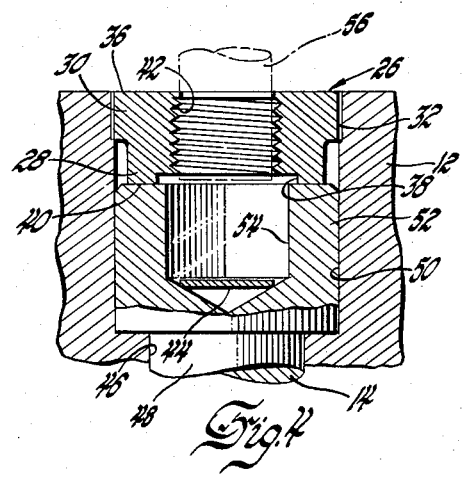
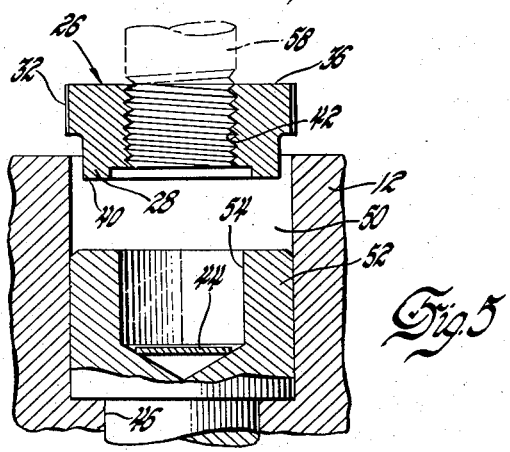
INVENTOR.
DALLAS B. AVERY SR.
ATTORNEY United States Patent Office 2,968,375
Patented Jan. 17, 1961

2,968,375

MACHINE RAIL STEEL PLUG

Dallas B. Avery, Sr., Pontiac, Mich., assignor to General Motors Corporation, Detroit, Mich., a corporation of Delaware Filed July 23, 1958, Ser. No. 750,341

3 Claims. (Cl. 189—36)

This invention relates to plugs, and more particularly to a hardened plug for filling a screw hole in the hardened rails of large machines.

In many manufacturing machines such as transfer machines, the movable machine saddle or head is supported on hardened steel rails secured to the machine base. In attaching the rails to the base, the conventional method is to counterbore a large number of holes through the hardened rail and into the base member, thread the portion in the base member and secure the rail to the base by a number of machine screws. In the normal machine, upward of seventy screws are used to secure the rails to the base.

Much difficulty has been had in the past in filling the screw holes in the hardened rail for proper motion of the machine saddle along the hardened rail. The general manner of filling the screw holes is to pour melted lead or babbitt on top of the machine screws, allow the material to harden, and grind or otherwise remove some of the lead or babbitt and provide a smooth surface. With this type of construction the soft plug formed picks up and retains cast-iron dust or shavings.

The usual machine saddle has a wear strip formed from a substance, such as laminated plastic between the saddle and the hardened rail, and a rubber wiper secured to the edge of the machine saddle to wipe shavings and cuttings from in front of the wear strip. In those machines using lead or babbitt plugs, the rubber wipers and the wear strips are damaged by the cuttings and shavings retained in the soft plugs. The strips are damaged to a point where they can not be adjusted, resulting in unacceptable machine finishes with regular cutting tools and greatly decreasing the life of cutting tools.

The device in which this invention is embodied comprises a plug, hardened to the same degree as the machine rail, and adapted to be removed when worn or damaged. The plug will not pick up and retain cuttings and shavings, thereby damaging the wipers and wear strips, and is easily manufactured and installed. The device eliminates the necessity of melting equipment, provides a longer life for the machine and the hardened rails, and provides even wear along the rail of the machine. The machine life is thus increased and cutting finishes and cutter life greatly improved. The device is simple and inexpensive to manufacture, providing a more economical installation with savings in time and operator effort. Down time of the machine is greatly decreased, improving the efficiency of the operation.

In the drawings:

Figure 1 is a fragmentary sectional view of a typical installation of the device in which this invention is embodied.

Figure 2 is an isometric view, with parts broken away and in section, of the plug of Figure 1.

Figure 3 is an enlarged view of a portion of Figure 1 with parts broken away and in section to illustrate the installation of the plug.

Figure 4 is an enlarged view of a portion of Figure 1 with parts broken away and in section to show one step in the removal of the plug from the machine rail.

Figure 5 is an enlarged view of a portion of Figure 1 with parts broken away and in section to illustrate the remove of the plug.

Referring more particularly to the drawings, Figure 1 illustrates a typical installation of the plug in a machine. The machine base 10 has the hardened rail 12 secured thereto by a plurality of machine screws 14. The machine screws may be of any conventional construction and are illustrated here as socket-headed, or Allen-headed, screws. The machine saddle 16 is supported on the machine rail 12 and has a wear strip 18, made of laminated plastic or any suitable material. A rubber wiper 20 and supporting channel 22 are secured to the side of the machine saddle 16 by machine screws 24. The hardened plug, illustrated generally by the numeral 26, is inserted in the machine rail 12 above the socket headed screw 14.

In Figure 2, the hardened cylindrical plug 26 is shown consisting of stepped portions 28 and 30. The larger diametered portion 30 has a knurled edge 32 which retains the plug in the screw hole 34. The plug, when installed, is press-fit to a level even with the top surface of the machine rail. The upper surface 36 of the plug is ground to a suitable finish in relation to the machine rail 12. The lower, smaller diametered portion 28 is cut back as at 38 to provide an annular surface 40 which contacts the top of the socket head screw 14. The cut back 38 and ridge 40 provide minimum contact between the plug and the screw head to allow for irregularities in the screw head while allowing a firm base for the plug to rest on.

An internal annular bore 42, having an internal screw thread therein, extends part way into the plug from the lower end. A thin wall 44 remains between the top surface 36 and the end of the bore 42. The purpose of the thin wall will be described below.

Figure 3 illustrates a typical installation of the plug. The machine rail 12 has a counterbored hole of a small diameter 46 to receive the shank 48 of the machine screw. The larger diameter 50 receives the socket head 52 of the machine screw. A socket 54 is provided to receive the Allen wrench, with which the machine screw is tightened. The plug 26 is press-fit into the larger diameter hole 50 and the knurled surface 32 secures the plug in the hole. The lower annular surface 40 is shown contacting the head 52 of the machine screw.

In removal of the plug from the machine rail, it is necessary to break out the thin wall portion 44 of the plug as illustrated in Figure 4. A punch, or other suitable tool, shown in dashed and dotted lines and indicated by the numeral 56, is placed on the surface 36 of the plug over the threaded bore 42. The punch is sharply tapped to break out the thin wall 44 and provide access to the threaded bore 42. It is then possible to insert a standard plug puller, illustrated by the numeral 58 and shown in dashed and dotted lines in Figure 5. The tool is threaded into the internal bore 42 of the plug 26 and the plug may be easily removed.

It is not intended to limit the use of the above described hardened plug to large manufacturing or transfer machines. The device is applicable to any installation which requires the filling of screw holes.

I claim:

1. In a machine, a hardened rail secured to a base member by a plurality of screws seated in counterbored holes and below the surface of said rail, a plug for each of said counterbored holes including a cylindrical body, a knurl on the cylindrical surface of said body retaining said plug in said counterbored hole, an internal threaded bore axially extending into said plug, a thin wall between the exposed surface of said plug and the end of said internal bore and flush with the surface of said hardened rail, said wall being adapted to be broken out for access to said threaded bore for removal of said plug when access to said screws is required, and an annular machined surface at the opposite end of said plug from said exposed surface to properly seat said plug on said screw, said exposed surface of said plug providing a smooth surface for said hardened rail.

2. In a machine, a hardened rail secured to a base member by a screw set in a counterbored hole and below the surface of said rail, a plug for said counterbored hole including a stepped cylindrical body, a knurl on the edge of the larger diametered portion of said plug retaining said plug in said counterbored hole, an internal threaded bore part way through said body, a thin wall between the top surface of said body and said internal bore and flush with the surface of said rail, said wall being adapted to be broken out for access to said threaded bore for removal of said plug when access to said screws is required, and an annular ridge at the opposite end of said body to set said plug on said rail retaining screw.

3. In a machine, a hardened rail secured to a base member by a plurality of screws seated in counterbored holes and below the surface of said rail, a plug for each of said counterbored holes including a cylindrical body, the external surface of said body retaining said plug in said counterbored hole, an internal threaded bore axially extending into said plug, a thin wall between the exposed surface of said plug and the end of said internal bore and flush with the surface of said hardened rail, said wall being adapted to be broken out for access to said threaded bore for removal of said plug when access to said screws is required, and an annular machined surface at the opposite end of said plug from said exposed surface to properly seat said plug on said screw, said exposed surface of said plug providing a smooth surface for said hardened rail.

References Cited in the file of this patent
UNITED STATES PATENTS

| | | |
|---|---|---|
| 1,933,117 | Markle | Oct. 31, 1933 |
| 1,945,495 | Rieke | Jan. 30, 1934 |
| 2,014,667 | Potter | Sept. 17, 1935 |
| 2,544,304 | Eckenbeck et al. | Mar. 6, 1951 |